United States Patent
Clemons et al.

(10) Patent No.: US 8,695,986 B2
(45) Date of Patent: Apr. 15, 2014

(54) CYLINDER HEAD GASKET ASSEMBLY

(75) Inventors: Douglas M. Clemons, Brighton, MI (US); Jake Hu, Canton, MI (US); Emma Grissom, Howell, MI (US)

(73) Assignee: Federal-Mogul Corporation, Southfield, MI (US)

( * ) Notice: Subject to any disclaimer, the term of this patent is extended or adjusted under 35 U.S.C. 154(b) by 378 days.

(21) Appl. No.: 12/859,398

(22) Filed: Aug. 19, 2010

(65) Prior Publication Data

US 2011/0042904 A1 Feb. 24, 2011

Related U.S. Application Data

(60) Provisional application No. 61/235,211, filed on Aug. 19, 2009.

(51) Int. Cl.
 *F02F 11/00* (2006.01)
(52) U.S. Cl.
 USPC ............................ 277/592; 277/595; 277/598
(58) Field of Classification Search
 USPC .......................................... 277/592, 595, 598
 See application file for complete search history.

(56) References Cited

U.S. PATENT DOCUMENTS

| 4,196,913 | A | * | 4/1980 | Oka ............................... 277/595 |
| 4,272,085 | A | * | 6/1981 | Fujikawa et al. ............. 277/594 |
| 4,285,527 | A | * | 8/1981 | Connely ........................ 277/595 |
| 4,348,032 | A | * | 9/1982 | Hanson et al. ................. 277/594 |
| 4,351,534 | A |   | 9/1982 | McDowell |
| 4,387,904 | A | * | 6/1983 | Nicholson ..................... 277/595 |
| 4,468,044 | A | * | 8/1984 | Ulmer et al. .................. 277/596 |
| 4,635,949 | A | * | 1/1987 | Lucas et al. ................... 277/595 |
| 4,714,260 | A | * | 12/1987 | Udagawa ....................... 277/595 |
| 4,754,982 | A |   | 7/1988 | Udagawa et al. |
| 4,759,585 | A |   | 7/1988 | Udagawa |
| 4,799,695 | A |   | 1/1989 | Yoshino |
| 4,869,516 | A |   | 9/1989 | Udagawa et al. |
| 4,896,891 | A |   | 1/1990 | Udagawa |
| 4,968,045 | A |   | 11/1990 | Abe et al. |
| 4,971,338 | A |   | 11/1990 | Udagawa |
| 5,039,117 | A |   | 8/1991 | Gohrlich et al. |
| 5,197,747 | A |   | 3/1993 | Ueta et al. |
| 5,277,433 | A | * | 1/1994 | Ishikawa et al. .............. 277/593 |

(Continued)

FOREIGN PATENT DOCUMENTS

| JP | 01285645 A | 11/1989 |
| JP | 07253163 A | 10/1995 |

(Continued)

*Primary Examiner* — Vishal Patel
(74) *Attorney, Agent, or Firm* — Robert L. Stearns; Dickinson Wright, PLLC

(57) ABSTRACT

A static cylinder head gasket assembly includes an inner distance layer having an opening extending between opposite planar sides with the opening being configured to register with a cylinder bore of an internal combustion engine. A plurality of inner functional layers overlie each of the opposite sides of the inner distance layer. The inner functional layers have axially aligned, nested annular sealing beads extending about the opening in the distance layer. The gasket assembly further includes a plurality of outer functional layers separate from the inner functional layers. The outer functional layers have annular inner peripheries spaced axially from one another to provide a gap configured to receive at least a portion of the inner distance layer therein. The outer periphery of the inner distance layer is captured axially between the outer functional layers and thus, the inner distance layer is prevented from being disassembled from the outer functional layers.

8 Claims, 4 Drawing Sheets

(56) References Cited

U.S. PATENT DOCUMENTS

| | | | |
|---|---|---|---|
| 5,549,307 A | 8/1996 | Capretta et al. | |
| 6,076,833 A * | 6/2000 | Geshi | 277/595 |
| 6,131,915 A * | 10/2000 | Nicholson | 277/593 |
| 6,139,024 A * | 10/2000 | Yakushiji et al. | 277/592 |
| 6,142,482 A * | 11/2000 | Goto et al. | 277/591 |
| 6,250,645 B1 * | 6/2001 | Udagawa | 277/595 |
| 6,431,554 B1 | 8/2002 | Miyamoto et al. | |
| 6,439,579 B2 * | 8/2002 | Uemura et al. | 277/595 |
| 6,585,272 B2 | 7/2003 | Inamura et al. | |
| 6,676,134 B1 * | 1/2004 | Wiegert et al. | 277/593 |
| 6,702,297 B2 | 3/2004 | Furuta et al. | |
| 6,758,479 B2 | 7/2004 | Miyaoh | |
| 7,000,924 B2 | 2/2006 | Hohe et al. | |
| 7,131,649 B2 | 11/2006 | Sueda | |
| 7,213,813 B2 | 5/2007 | Sueda | |
| 7,377,520 B2 | 5/2008 | Imai | |
| 7,407,164 B2 * | 8/2008 | Diez et al. | 277/592 |
| 2005/0110223 A1 * | 5/2005 | Pepin | 277/598 |
| 2005/0189724 A1 | 9/2005 | Schmitz | |
| 2007/0096401 A1 | 5/2007 | Sueda | |
| 2007/0290452 A1 | 12/2007 | Matsushita et al. | |
| 2008/0164659 A1 * | 7/2008 | Kinoshita | 277/595 |
| 2008/0237997 A1 | 10/2008 | Murata et al. | |
| 2009/0066036 A1 * | 3/2009 | Schmitz | 277/595 |
| 2009/0166986 A1 | 7/2009 | Yasuda | |

FOREIGN PATENT DOCUMENTS

| | | |
|---|---|---|
| JP | 2002147609 A | 5/2002 |
| JP | 2008025737 A | 2/2008 |
| JP | 2008223917 A | 9/2008 |

* cited by examiner

CYLINDER HEAD GASKET ASSEMBLY

CROSS-REFERENCE TO RELATED APPLICATIONS

This application claims the benefit of U.S. Provisional Application Ser. No. 61/235,211, filed Aug. 19, 2009, which is incorporated herein by reference in its entirety.

BACKGROUND OF THE INVENTION

1. Technical Field

This invention relates generally to static gaskets of the type used to establish a gas/fluid-tight seal between two members to be clamped together, and more particularly to multilayer static gaskets, such as a cylinder head gasket.

2. Related Art

In establishing a gas/fluid-tight seal between two members to be clamped together, such as a cylinder block and engine block, it is common to use a static cylinder head gasket having a pair of functional layers with a distance layer sandwiched between the functional layers. Generally, at least one of the functional layers has a seal bead to facilitate establishing a fluid tight seal. The distance layer is configured to abut the functional layer to facilitate establishing the fluid tight seal by compressing against the seal bead of the functional layer. Unfortunately, while fastening the cylinder block to the engine block, damage can occur to the seal bead through over-compression of the seal bead. If the seal bead is over-compressed, and substantially flattened, fatigue cracks can form in the area of the seal beads, such as during clamping or while in use. The fatigue cracks ultimately reduce the ability of the static gasket to establish an air and/or fluid-tight seal, thereby diminishing the life and performance of the engine. Further, with a single functional layer disposed to abut at least one side of the distance layer, it can prove difficult to achieve the line force necessary between the seal bead and the surface being sealed to establish a reliable gas/fluid tight seal.

SUMMARY OF THE INVENTION

A static cylinder head gasket assembly includes an inner distance layer having an opening extending between opposite planar sides with the opening being configured to register with a cylinder bore. A plurality of inner functional layers overlie each of the opposite sides of the inner distance layer. The inner functional layers have axially aligned, nested annular sealing beads extending about the opening in the distance layer.

In accordance with another aspect of the invention, the gasket assembly includes a plurality of outer functional layers separate from the inner functional layers. The outer functional layers have annular inner peripheries spaced axially from one another to provide a gap configured to receive at least a portion of the inner distance layer therein. Accordingly, the outer periphery of the inner distance layer is captured axially between the outer functional layers and thus, the inner distance layer is prevented from being disassembled from the outer functional layers.

In accordance with another aspect of the invention, the gasket assembly includes an outer distance layer sandwiched between the outer functional layers. The outer distance layer extends to an inner periphery that is configured to remain radially spaced from the outer periphery of the inner distance layer.

In accordance with another aspect of the invention, the inner distance layer floats axially between the outer functional layers and radially relative to the outer distance layer.

BRIEF DESCRIPTION OF THE DRAWINGS

These and other aspects, features and advantages of a gasket assembly constructed in accordance with the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
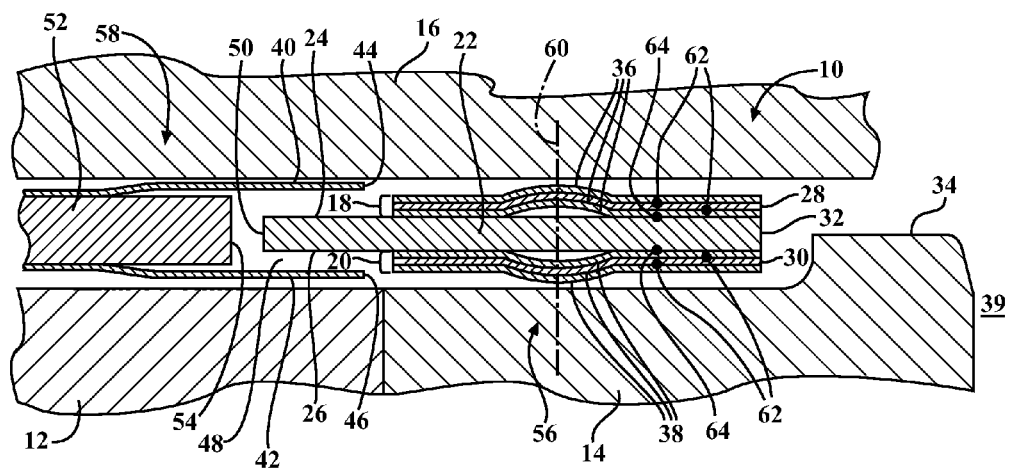
FIG. 1 is a radial cross-sectional side view of a cylinder head gasket assembly constructed in accordance with one aspect of the invention shown partially assembled between a cylinder liner, engine block and cylinder head.

Referring in more detail to the drawings, FIG. 1 illustrates a multilayer gasket assembly 10 constructed in accordance to one aspect of the invention. The gasket assembly 10 is represented here as a cylinder head gasket assembly provided to establish a gas/fluid tight seal between an engine block 12, a cylinder liner 14 and a cylinder head 16. The gasket assembly 10 has at least one multilayered inner functional layer, and shown here as a pair of multilayered, also referred to as stacked inner functional layers 18, 20. Further, by way of example, an inner distance layer 22 is sandwiched at least in part between the inner functional layers 18, 20. The inner functional layers 18, 20 are arranged to abut opposite sides 24, 26 of the inner distance layer 22. The inner functional layers 18, 20 each have an inner periphery 28, 30 bounding annular openings sized to register with an inner periphery 32 bounding an annular opening in the distance layer 22. The respective inner peripheries, also referred to as openings 28, 30, 32, are each arranged concentrically with one another, and are shown here as being configured to receive an upstanding flange 34 of the cylinder liner 14, for example. The multilayered functional layers 18, 20 each have respective annular full compression seal beads 36, 38 conforming with one another in a nested relation. The seal beads 36, 38 are shown here as extending axially outwardly from the surfaces 24, 26 of the distance layer 22 in axially aligned relation with one another to facilitate establishing a gas-tight seal between the cylinder head 16 and the cylinder liner 14, thereby maintaining the desired compression with a cylinder bore 39. The gasket assembly 10 further includes outer functional layers, represented as being single layer outer functional layers 40, 42 with an outer distance layer 52 sandwiched therebetween. The outer functional layers 40, 42 have annular inner peripheries 44, 46 spaced axially from one another, at least in part as a result of the outer distance layer 52, to provide an annular gap 48 sufficiently sized to receive an outer periphery 50 of the inner distance layer 22 for a clearance fit therein. As such, the inner distance layer 22 is captured axially against inadvertent disassembly from the outer functional layers 40, 42. The outer distance layer 52 is flat or substantially flat and has an inner periphery 54 bounding an opening sized to receive the inner distance layer 22 in a clearance fit. As such, an inner gasket subassembly 56 provided by the inner functional layers 18, 20 and the inner distance layer 22 is able to float radially and axially relative to an outer gasket subassembly 58 provided by the outer functional layers 40, 42 and the outer distance layer 52, however, the inner subassembly 56 is captured against separation from the outer subassembly 58 as a result of a radially inner portion of the outer functional layers 40, 42 overlying a radially outer portion of the inner distance layer 32. Accordingly, the inner subassembly 56 and outer subassembly 58 are able to float independently from one another to accommodate an offset (standoff) between the cylinder liner 14 and the engine block 12. As such, manufacturing tolerances of the engine block 12 and the cylinder liner 14 can be relaxed, while at the same time, providing a reliable gas/fluid tight seal between the mating engine components.

The inner stacked functional layers 18, 20 and the outer individual functional layers 40, 42 are constructed from a resilient metal, such as spring steel, for example, and can be provided having any suitable individual layer thickness, depending on the sealing requirements. With the stacked inner functional layers 18, 20 each having multiple layers, shown here as each having three abutting layers, by way of example and without limitation, the line contact force established substantially along the lines 60 can be precisely controlled and maximized to ensure a reliable seal is established for the intended application. The line contact force 60 is able to be precisely established as a result of being able to adjust the number of individual layers stacked in abutment with one another, while also being able to adjust the thickness of the individual layers (FIG. 7) abutting one another. Accordingly, the individual layers of the stacked inner functional layers 18, 20 can be provided having different thicknesses from one another, and further yet, different types of material having different physical properties, e.g. elasticity and spring rate, can be used for one or more of the individual layers of the stacked layers 18, 20, if desired.

The inner and outer distance layers 22, 52 can be constructed from a relatively rigid metal material, such as cold-rolled steel or stainless steel, for example. The distance layers 22, 52 each have a generally symmetrical body in radial cross-section given they are flat or substantially flat. Depending on the application, the inner and outer distance layers 22, 52 can be constructed having the same, substantially the same, or different thicknesses. As shown in FIG. 1, the outer distance layer 52 is thicker than the inner distance layer 22. This is due in part to the fact that the inner functional layers 18, 20 are multilayered, while the outer functional layers 40, 42 are single layers. As such, the relative thicknesses of the inner and outer distance layers 22, 52 can be adjusted depending on the number and thickness of the individual layers used to construct each multilayered inner functional layer 18, 20.

Upon assembly of the gasket 10, at least a portion of the outer functional layers 40, 42 overlie at least a portion of the inner distance layer 22, and thus, maintain the inner assembly 56 and outer assembly 58 as a unitized component. As such, as discussed above, the inner gasket subassembly 56 can float radially and axially relative to the outer gasket subassembly 58, however, the gasket assembly 10 can be handled during assembly without concern of inadvertent disassembly of the inner gasket subassembly 56 from the outer gasket subassembly 58. Of course, the degree of relative float between the inner and outer assemblies 56, 58 can be controlled and minimized, if desired, by controlling the size of the gap 48 and corresponding dimensions of the inner distance layer 22 (outer diameter and thickness thereof).

In the construction of the gasket assembly 10, it should be recognized that the individual layers of the multilayered inner functional layers 18, 20 can remain detached from one another, or they can be fixed to one another, such as via weld joints 62 in a welding process, for example. Further, the functional layers 18, 20 can remain detached from or fixed to the inner distance layer 22, such as via a weld joint 64, as desired. Likewise, the outer functional layers 40, 42 can remains separate from or fixed to the outer distance layer 52. To facilitate handling in manufacture, the inner functional layers 18, 20 are preferably fixed to the inner distance layer 22 and the outer functional layers 40, 42 are preferably fixed to the outer distance layer 52.

Figure 2:
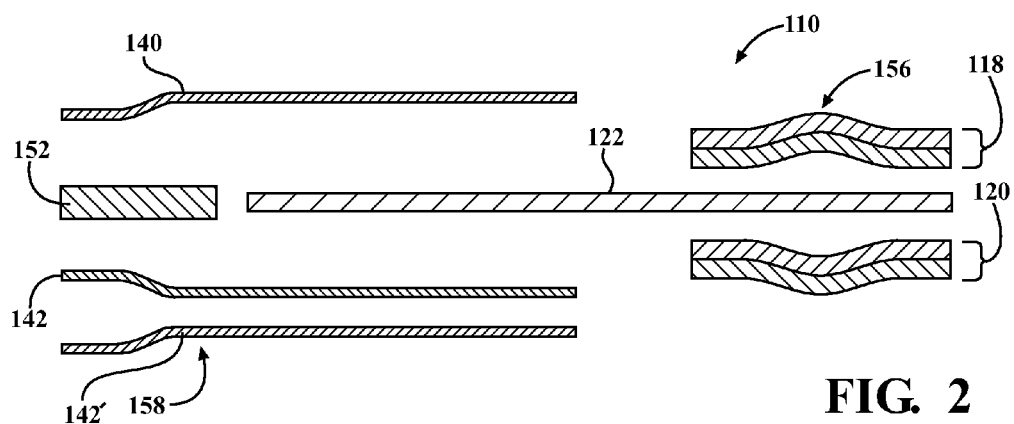
FIG. 2 is a radial cross-sectional partially exploded side view of a cylinder head gasket assembly constructed in accordance with another aspect of the invention.

In FIG. 2, a gasket assembly 110 constructed in accordance with another aspect of the invention is shown, wherein the same reference numerals offset by a factor of 100 are used to identify similar features as described above. The gasket assembly 110 has inner and outer subassemblies 156, 158 substantially as described above, however, the inner subassembly 156 has multilayered inner function layers 118, 120 with a distance layer 122 sandwiched there between, wherein each functional layer 118, 120 has a pair of separate abutting functional layers, rather than three separate abutting functional layers as in the previous embodiment. In addition, the outer subassembly 158 has a pair of outer functional layers 140, 142 with an outer distance layer 152 sandwiched there between, and further, includes an additional functional layer 142' configured in mirrored relation for abutment with the adjacent functional layer 142. Otherwise, the gasket assembly 110 is the same as described above.

In FIGS. 3-7, respective inner subassemblies 256, 356, 456, 556, 656 are shown constructed in accordance with additional aspects of the invention.

Figure 3:
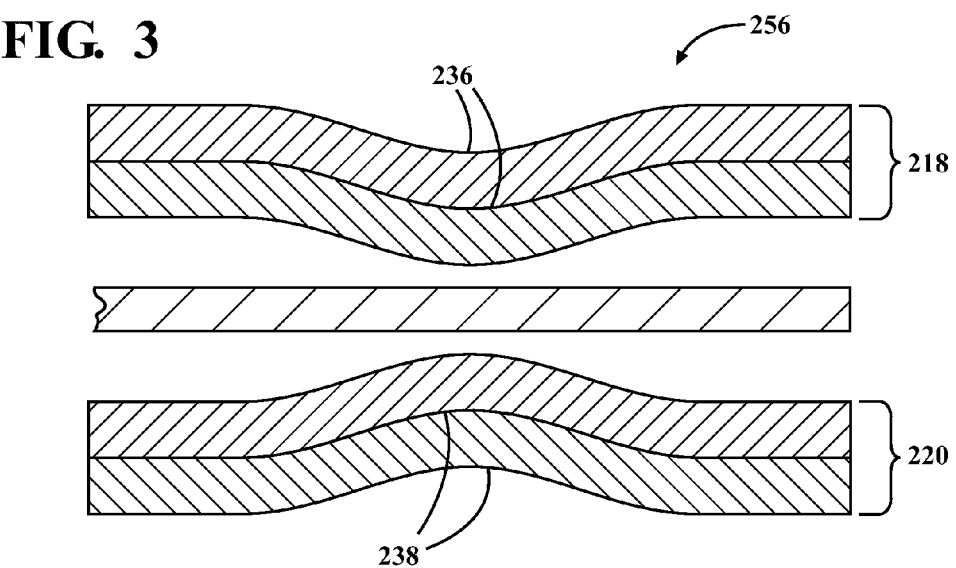
FIG. 3 is a radial cross-sectional side view of an inner distance layer with a plurality of functional layers configured in accordance with yet another aspect of the invention.

As shown in FIG. 3, the inner subassembly 256 is similar to the inner subassembly 156 of FIG. 2, however, the functional layers 218, 220 have full beads 236, 238 facing axially inwardly toward one another in mirrored relation with one another, rather than facing axially outwardly from one another, as in FIG. 2.

Figure 4:
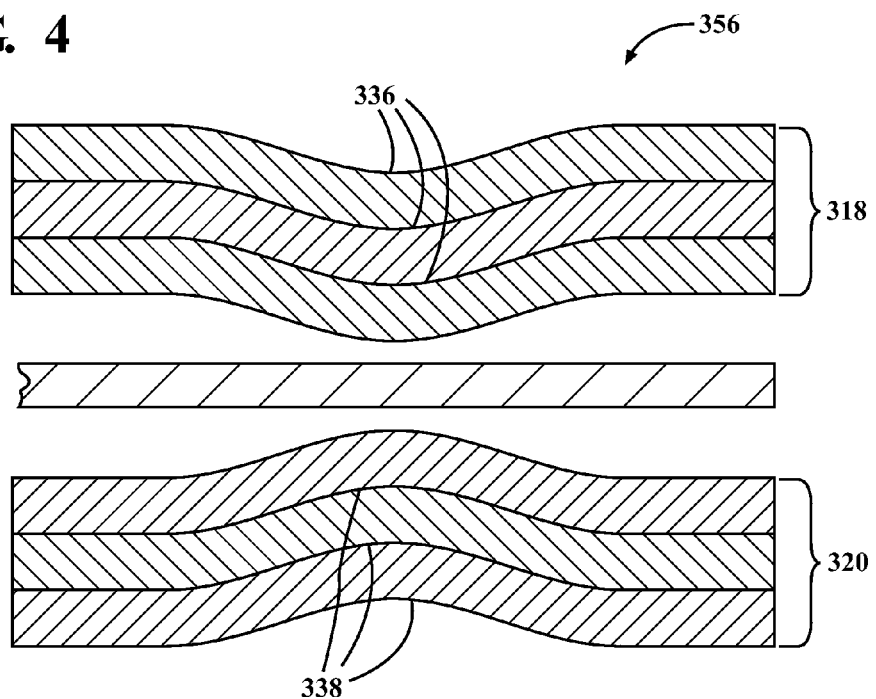
FIG. 4 is a radial cross-sectional side view of an inner distance layer with a plurality of functional layers configured in accordance with yet another aspect of the invention.

As shown in FIG. 4, the inner subassembly 356 is similar to the inner subassembly 56 of FIG. 1, however, the functional layers 318, 320 have full beads 336, 338 facing axially inwardly toward one another in mirrored relation with one another, rather than facing axially outwardly from one another, as in FIG. 1.

Figure 5:
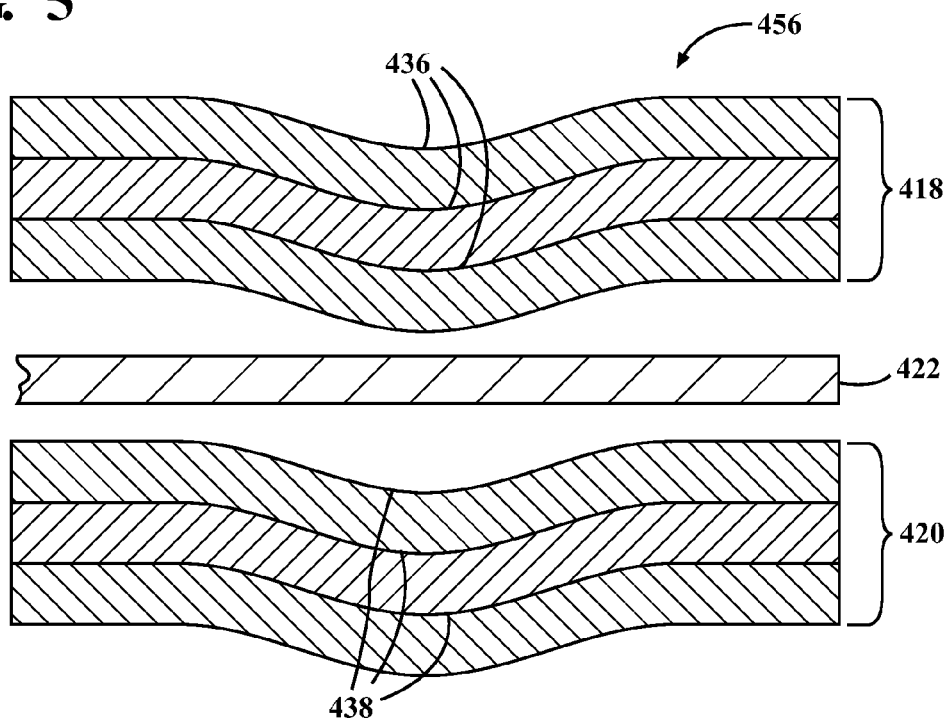
FIG. 5 is a radial cross-sectional side view of an inner distance layer with a plurality of functional layers configured in accordance with yet another aspect of the invention.

As shown in FIG. 5, the inner subassembly 456 is similar to the inner subassemblies 56, 356 of FIGS. 1 and 4, however, the functional layers 418, 420 have full beads 436, 438 facing axially inwardly in the same direction with one another, such that the full beads 436, 438 would nest with one another if not for the intervening distance layer 422.

Figure 6:
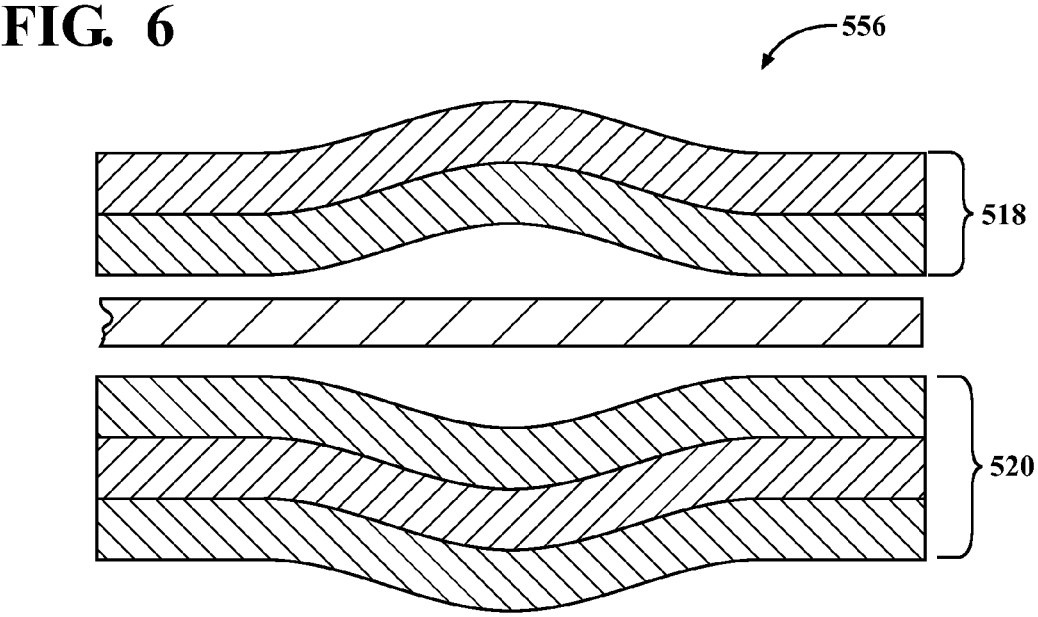
FIG. 6 is a radial cross-sectional side view of an inner distance layer with a plurality of functional layers configured in accordance with yet another aspect of the invention.

As shown in FIG. 6, the inner subassembly 556 has a different number of inner functional layers 518 overlying one of the opposite sides of the distance layer 522 than the number of functional layers 520 overlying the other of the opposite sides of the distance layer 522. The upper functional layers 518 are similar in number and configuration to the inner subassembly 156 of FIG. 2 and the lower functional layers 520 are similar in number and configuration to the inner subassembly 56 of FIG. 1.

Figure 7:
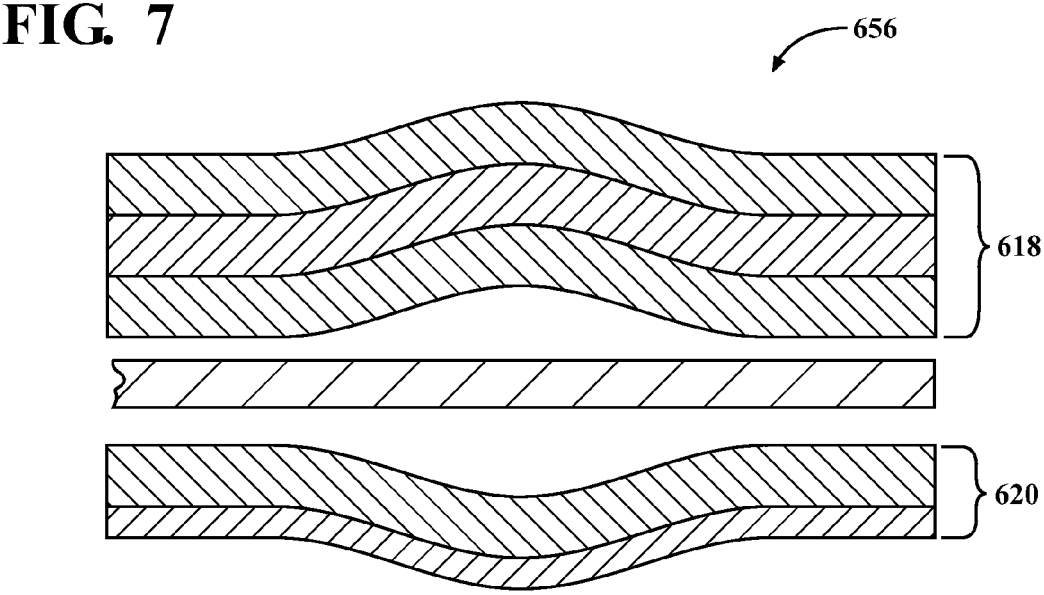
FIG. 7 is a radial cross-sectional side view of an inner distance layer with a plurality of functional layers configured in accordance with yet another aspect of the invention.

As shown in FIG. 7, the inner subassembly 656 is similar to the inner subassembly 556 in that it has a different number of inner functional layers 618 overlying one of the opposite sides of the distance layer 622 than the number of functional layers 620 overlying the other of the opposite sides of the distance layer 622. However, the upper functional layers 618 are similar in number and configuration to the inner subassembly 56 of FIG. 1 and the lower functional layers 620 are similar in number and configuration to the inner subassembly 156 of FIG. 2.

It should be recognized that the number of individual layers used to form the multilayered inner functional layers can be provided other than illustrated, and further, that the individual thicknesses can also be varied, as desired. Accordingly, the embodiments illustrated are only representative of presently preferred embodiments and are not meant to be illustrative of all the contemplated embodiments within the scope of the invention.

Obviously, many modifications and variations of the present invention are possible in light of the above teachings. It is, therefore, to be understood that within the scope of the of any ultimately allowed claims, the invention may be practiced otherwise than as specifically described.

What is claimed is:

1. A static cylinder head gasket assembly, comprising: an inner distance layer having an opening extending between planar opposite sides, said opening being configured to register with a cylinder bore; and inner functional layers on said opposite sides of said distance layer, each of said inner functional layers having a plurality of abutting metal layers, each of said abutting metal layers being formed of resilient, springy metal and each of said abutting metal layers of said inner functional layers having axially aligned, annular sealing beads received in one another in nested relation, wherein said annular sealing beads extend about said opening in said distance layer, a plurality of metal outer functional layers separate from said inner functional layers, said outer functional layers having annular inner peripheries spaced axially from one another by an annular gap, said annular gap receiving at least a portion of the inner distance layer therein, said inner distance layer has an annular outer periphery and further including an outer distance layer sandwiched between said outer functional layers, said outer distance layer having an inner periphery configured in radially spaced relation from said outer periphery of said inner distance layer.

2. The static cylinder head gasket assembly of claim 1 wherein said at least a portion of said inner distance layer floats axially between said outer functional layers in said gap and radially relative to said outer distance layer.

3. The static cylinder head gasket assembly of claim 1 wherein said inner distance layer and said outer distance layer have different thicknesses.

4. The static cylinder head gasket assembly of claim 1 wherein said axially aligned, nested annular sealing beads are full beads, said full beads on one side of said inner distance layer and said full beads on the opposite said of said inner distance layer facing axially toward one another in mirrored relation.

5. The static cylinder head gasket assembly of claim 1 wherein said axially aligned, nested annular sealing beads are full beads, said full beads on one side of said inner distance layer and said full beads on the opposite said of said inner distance layer facing axially away from one another in mirrored relation.

6. The static cylinder head gasket assembly of claim 1 wherein said axially aligned, nested annular sealing beads are full beads, said full bead on one side of said inner distance layer and said full beads on the opposite said of said inner distance layer facing axially in the same direction.

7. The static cylinder head gasket assembly of claim 1 wherein said plurality of inner functional layers overlying each of said opposite sides of said distance layer includes a different number of inner functional layers overlying one of said opposite sides than the number of functional layers overlying the other of said opposite sides.

8. The static cylinder head gasket assembly of claim 1 wherein at least some of the individual functional layers have different thicknesses relative to one another.

* * * * *